(12) United States Patent
Woo et al.

(10) Patent No.: US 6,506,811 B2
(45) Date of Patent: Jan. 14, 2003

(54) CARBAMATE SOLUTIONS

(75) Inventors: Peter Woo, Diepholz (DE); Anke Schulze, Wetschen (DE); Edmund Stadler, Hollfeld (DE); Dieter Tintelnot, Diepholz (DE); Udo Hadick, Cloppenburg (DE); Ralf Hinrichs, Ehrenburg (DE); Horst Hürkamp, Dinklage (DE); Klaus Sobolewski, Diepholz (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/966,823

(22) Filed: Sep. 28, 2001

(65) Prior Publication Data
US 2002/0133040 A1 Sep. 19, 2002

Related U.S. Application Data

(62) Division of application No. 09/439,031, filed on Nov. 12, 1999, now Pat. No. 6,316,662.

(30) Foreign Application Priority Data

Nov. 16, 1998 (DE) ......................................... 198 52 681

(51) Int. Cl.$^7$ ................................................. C08J 9/12
(52) U.S. Cl. ....................... 521/130; 521/115; 521/116; 521/128; 521/129; 521/170; 521/172; 521/174
(58) Field of Search ................................ 521/116, 115, 521/128, 129, 130, 170, 172, 174

(56) References Cited

U.S. PATENT DOCUMENTS

| | | |
|---|---|---|
| 4,386,218 A | 5/1983 | Rasshofer et al. |
| 4,418,160 A | 11/1983 | Rasshofer et al. |
| 4,499,038 A | 2/1985 | Schäfer et al. |
| 4,500,656 A | 2/1985 | Rasshofer et al. |
| 4,532,266 A | 7/1985 | Rasshofer et al. |
| 4,532,317 A | 7/1985 | Rasshofer |
| 4,540,720 A | 9/1985 | Rasshofer et al. |
| 4,645,630 A | 2/1987 | Rasshofer et al. |
| 4,723,032 A | 2/1988 | Rasshofer et al. |
| 4,735,970 A | 4/1988 | Sommerfeld et al. |
| RE32,677 E | 5/1988 | Rasshofer et al. |
| 5,006,569 A | 4/1991 | Stone |
| 5,464,880 A | 11/1995 | Weber et al. |
| 5,789,451 A * | 8/1998 | Guidetti et al. ............. 521/116 |
| 5,859,285 A * | 1/1999 | Guidetti et al. ............. 521/128 |
| 5,872,156 A | 2/1999 | Inazawa et al. |
| 5,874,021 A | 2/1999 | Inazawa et al. |

FOREIGN PATENT DOCUMENTS

| | | |
|---|---|---|
| EP | 0 121 850 B1 | 10/1984 |
| EP | 0 236 895 A2 | 9/1987 |
| EP | 0 415 599 A2 | 3/1991 |
| EP | 0 652 250 B1 | 5/1995 |
| EP | 0 854 159 A1 | 7/1998 |
| EP | 0915922 | 5/1999 |
| EP | 1000955 | 5/2000 |
| WO | WO 98/04606 | 2/1998 |

OTHER PUBLICATIONS

EPO Search Report & Translation (2000).

* cited by examiner

Primary Examiner—John M. Cooney, Jr.
(74) Attorney, Agent, or Firm—Mary K. Cameron

(57) ABSTRACT

Carbamate solutions are obtainable by reacting at least one alkanolamine with carbon dioxide in, as solvent, at least one organic compound having a molecular weight of from 60 to 600 and containing at least one hydroxyl group, wherein the carbamate contains at least 0.51 mol of bound carbon dioxide per mole of alkanolamine and the alkanolamine has one of the following formulae:

$$NH_2—X—OH \quad (I)$$

$$HO—X—Y—OH \quad (II)$$

$$HO—X—NR^9—(CR^7R^8)_{n5}—Y—OH \quad (III)$$

where

X: $—[(CR^1R^2)_{n1}—NR^3]_{n2}—[(CR^4R^5)_{n3}—NR^6]_{n4}—(CR^7R^8)_{n5}—$

Y: $—[NR^6—(CR^4R^5)_{n3}]_{n4}—[NR^3—(CR^1R^2)_{n1}]_{n2}—$ and n1, n3, n5: identical or different integers selected from the group consisting of 1, 2, 3, 4, n2, n4: identical or different integers selected from the group consisting of 0, 1, 2, 3, 4, 5, 6, where for each of X and Y the sum of n2 and n4 is greater than or equal to 1, R1, R2, R4, R5, R7, R8: identical or different radicals selected from the group consisting of hydrogen, aliphatic, cycloaliphatic, araliphatic and aromatic radicals having from 1 to 20 carbon atoms, R3, R6, R9: identical or different radicals selected from the group consisting of hydrogen, aliphatic, cycloaliphatic, araliphatic and aromatic radicals having from 1 to 20 carbon atoms.

21 Claims, No Drawings

CARBAMATE SOLUTIONS

This is a division of application Ser. No. 09/439,031, filed Nov. 12, 1999, now U.S. Pat. No. 6,316,662.

The present invention relate mate solutions obtainable by reacting at least one alkanolamine with carbon dioxide in, as solvent, at least one organic compound having a molecular weight of from 60 to 600 and containing at least one hydroxyl group, wherein the carbamate contains at least 0.51 mol, preferably from 0.61 to 2.5 mol, of bound carbon dioxide per mole of alkanolamine and the alkanolamine has one of the following formulae:

$$NH_2-X-OH \qquad (I)$$

$$HO-X-Y-OH \qquad (II)$$

$$HO-X-NR^9-(CR^7R^8)_{n5}-Y-OH \qquad (III)$$

where

X: $-[(CR^1R^2)_{n1}-NR^3]_{n2}-[(CR^4R^5)_{n3}-NR^6]_{n4}-(CR^7R^8)_{n5}-$

Y: $-[NR^6-(CR^4R^5)_{n3}]_{n4}-[NR^3-(CR^1R^2)_{n1}]_{n2}-$ and

- n1, n3, n5: identical or different integers selected from the group consisting of 1, 2, 3, 4,
- n2, n4: identical or different integers selected from the group consisting of 0, 1, 2, 3, 4, 5, 6, preferably 0 and/or 1, where for each of X and Y the sum of n2 and n4 is greater than or equal to 1,
- R1, R2, R4, R5, R7, R8: identical or different radicals selected from the group consisting of hydrogen, aliphatic, cycloaliphatic, araliphatic and aromatic radicals having from 1 to 20 carbon atoms, preferably from the group consisting of hydrogen, methyl, ethyl, propyl, isopropyl, butyl,
- R3, R6, R9: identical or different radicals selected from the group consisting of hydrogen, aliphatic, cycloaliphatic, araliphatic and aromatic radicals having from 1 to 20 carbon atoms, preferably from the group consisting of hydrogen, methyl, ethyl, propyl, isopropyl, butyl, where preferably in (I), (II) and (III), particularly preferably in (II) and (III), at least one of the radicals $R^3$, $R^6$, $R^9$ is hydrogen.

Furthermore, the invention relates to processes for producing foams based on polyisocyanate polyaddition products and to polyisocyanate polyaddition products obtainable in this way.

Foamed polyisocyanate polyaddition products, which usually comprise polyurethane and possibly polyisocyanurate structures, are generally known. As blowing agent for producing these foams, use is frequently made of water which reacts with the isocyanate groups to form carbon dioxide which is the actual blowing agent. Furthermore, to supply carbon dioxide as blowing agent in the production of the foams, WO 98/04606, EP-A 652 250, EP-A 121 850 and EP-A 236 895 disclose carbamates, usually adducts of carbon dioxide to alkanolamines. Compared to water, the use of these carbamates as blowing agent has the significant advantage that the formation of urea structures in the foams resulting from the reaction of water with the isocyanate groups is avoided. As carbon dioxide-amine adducts, the carbamates liberate the chemically bound carbon dioxide during the polyisocyanate polyaddition reaction. A disadvantage of the known carbamates is their low content of carbon dioxide, based on the amines. The alkanolamines described in WO 98/04606 and EP-A 652 250 bind no more than 0.5 mol of carbon dioxide per mol of alkanolamine, since two mol of amine groups are required to bind one mol of carbon dioxide. A further significant disadvantage, particularly of the teachings of EP-A 121 850, is the preferred preparation of the carbamates in an aqueous medium, since the water reacts with the isocyanates during the production of the foamed polyisocyanate polyaddition products. Even if water is used as additional blowing agent, specific metering in admixture with the carbamate is difficult to achieve. In addition, especially carbamates which have been prepared without solvent have an undesirably high viscosity which makes their use in the production of foams more difficult.

Since the amines can, owing to their catalytic activity, influence the polyaddition reaction, the amount of carbamate which can be used is limited. The ability to produce foams, particularly those having a low density and thus a high volume yield from the weight of reaction mixture used, is therefore restricted.

It is an object of the present invention to develop carbamates obtainable by reacting at least one alkanolamine with carbon dioxide, which carbamates contain as many mol of carbon dioxide as possible per mol of alkanolamine. Furthermore, the carbamates should have a desirably low viscosity in order to make them easier to use in the polyisocyanate polyaddition reaction. In addition, a process for producing foams based on polyisocyanate polyaddition products, preferably flexible foams, in particular flexible or semirigid integral foams based on polyisocyanate polyaddition products, for example by reacting (a) isocyanates with (b) compounds which are reactive toward isocyanates in the presence of (c) blowing agents and, if desired, (d) catalysts and/or (e) auxiliaries and/or additives, is to be developed. Such a process should improve the volume yield of carbamate-foamed foams and the economics, for example by saving blowing agents or catalysts, and foams having a relatively low density should be able to be obtained. Furthermore, the mechanical properties of the polyisocyanate polyaddition products, in particular flexible or semirigid integral foams, e.g. the abrasion behavior, the tensile strength and the visual appearance of the external skin, should be improved.

We have found that this object is achieved by the above-defined carbamates in the novel solutions of the carbamates in the solvents and their use as blowing agents in processes for producing foams based on polyisocyanate polyaddition products.

The carbamates of the present invention have the particular advantage that they are based on alkanolamines which can bind more than 0.5 mol of carbon dioxide per mole of alkanolamine. This is due to the particular structure of the alkanolamines used. In addition, the viscosity of the solutions has been able to be matched to the requirements in foam production. None of the documents cited disclose this inventive solution or make it obvious. EP-A 121 850 specifically states that the preparation of the carbamates is preferably carried out without organic solvents. The high molecular weight polyols indicated in EP-A 121 850 as possible, but not preferred, solvents have the specific disadvantage that a solution of the carbamate in these compounds has an undesirably high viscosity.

Particular preference is given to carbamate solutions based on $NH_2-CH_2-CH_2-NH-CH_2-CH_2-OH$, hereinafter referred to as 2-(2-aminoethylamino)ethanol, $H_2N-(CH_2)_2-NH-(CH_2)_3-OH$
(3-[(2-aminoethyl)amino]propanol), $H_2N-(CH_2)_3-NH-(CH_2)_2-OH$ (2-[(3-aminopropyl)amino]ethanol), $CH_3$—CHOH—
   $CH_2$—NH—$(CH_2)_2$—$NH_2$
(1-[(2-aminoethyl)amino]-2-propanol, HO—$(CH_2)_2$—
   $NCH_3$—$(CH_2)_3$—$NH_2$
(2-[(3-aminopropyl)methylamino]ethanol,
1-[(2-amino-1-methylethyl)amino]-2-propanol,
2-[(2-amino-2-methylpropyl)amino]-2-methyl-1-propanol,
2-[(4-amino-3-methylbutyl)amino]-2-methyl-1-propanol,
17-amino-3,6,9,12,15-pentaazaheptadecan-1-ol and/or
3,7,12,16-tetraazaoctadecane-1,18-diol, in particular those based on 2-(2-aminoethylamino)ethanol as alkanolamine.

According to the present invention, these carbamates are prepared by introducing solid or gaseous carbon dioxide into a solution of the alkanolamine or alkanolamines in at least one of the solvents described below, usually at from 0 to 130° C., preferably from 20 to 100° C. The preparation of the carbamates can be carried out as described in EP-A 236 895, page 6, line 50 to page 7, line 9. The alkanolamine or alkanolamines is/are preferably saturated with carbon dioxide to prepare the carbamates.

Solvents used in the preparation of the carbamates are organic compounds containing at least one, preferably from 2 to 8, in particular 2 or 3, hydroxyl groups and having a molecular weight of from 60 to 600, preferably from 60 to 300, for example customary chain extenders and/or crosslinkers which are known for the polyisocyanate polyaddition reaction, preferably ethylene glycol, diethylene glycol, 1,2- and/or 1,3-propanediol, dipropylene glycol, 1,4-, 1,2- and/or 1,3-butanediol, 1,6-hexanediol, glycerol, polyether polyols, for example polyoxyethylene polyols, polyoxypropylene polyols and/or polyoxyethylene-polyoxypropylene polyols, particularly preferably ethylene glycol and/or 1,4-butanediol.

To prepare the carbamate solutions, preference is given to using solutions of alkanolamine and solvents in which the weight ratio of solvent to alkanolamine is from 0.05:1 to 10:0.5, preferably from 0.4:1 to 2:1, particularly preferably from 0.6:1 to 1.2:1.

The carbamates (solutions) prepared in this way preferably have a viscosity at 25° C. of less than 2000 mPas, preferably less than 1500 mpas, and are used according to the present invention as blowing agents for producing foams, preferably flexible foams, particularly preferably flexible or semirigid integral foams, i.e. foams which have a compact skin and a cellular, foamed core, in each case based on polyisocyanate polyaddition products, usually polyurethanes and/or polyisocyanurates, preferably polyurethanes. The polyisocyanate polyaddition products are usually produced by reacting (a) isocyanates with (b) compounds which are reactive toward isocyanates in the presence of (c) blowing agents comprising, according to the present invention, the novel carbamates, and, if desired, (d) catalysts and/or (e) auxiliaries and/or additives.

The carbamates prepared according to the present invention can be advantageously used directly in solution together with the solvents according to the present invention as blowing agents for producing the foams.

The foams based on polyisocyanate polyaddition products are particularly suitable, for example, in automobile construction, e.g. as steering wheels, spoilers or dashboards, or as shoe soles or shoe linings.

These polyisocyanate polyaddition products, in particular the steering wheels, spoilers, dashboards, shoe soles or shoe linings, produced according to the present invention have the following advantages:

The high content of carbon dioxide in the carbamates makes it possible to produce foams having a lower density without having to accept the disadvantages of further physical blowing agents.

Owing to the low viscosity of the carbamates of the present invention, it is possible to achieve a significantly higher carbon dioxide loading of the alkanolamines than has hitherto been possible.

Appropriate selection of the solvent enables the rate of liberation of carbon dioxide from the carbamate during the polyisocyanate polyaddition reaction to be controlled.

The carbamates act as catalyst in the reaction of the isocyanates with the compounds which are reactive toward isocyanates. The addition of further catalysts can therefore be reduced. "Fogging", i.e. the undesired emission of volatile substances from the foam, and an unpleasant odor can thus be reduced.

Particularly in the case of integral foams, the mechanical properties of these materials are significantly improved. The compact outer skin has only few pores, if any. Furthermore, the abrasion and the tensile strength, particularly of the outer skin, are improved. Formation of pebbling and pores on the outer skin as a result of mechanical stresses was able to be significantly reduced.

As isocyanates (a), preference is given to using (cyclo) aliphatic and/or, in particular, aromatic polyisocyanates, preferably diisocyanates. Isocyanates which are particularly suitable for producing the polyisocyanate polyaddition products according to the present invention are aromatic diisocyanates, preferably diphenylmethane diisocyanate (MDI) and tolylene diisocyanate (TDI). The isocyanates can be used in the form of the pure compounds or in modified form, for example in the form of uretdiones, isocyanurates, allophanates or biurets, preferably in the form of reaction products containing urethane- and isocyanate groups, known as isocyanate prepolymers, and/or carbodiimide-modified isocyanates.

As (b) compounds which are reactive toward isocyanates, it is possible to use, for example, compounds having at least two hydrogen atoms which are reactive toward isocyanate, for example polycarbonate diols, polyether polyalcohols and/or polyester polyalcohols, hereinafter also referred to as polyols. Preference is given to using polyols having a functionality of from 2 to 8, in particular from 2 to 6, and a molecular weight of from 500 to 10,000, in particular from 1000 to 6000. Polyetherols are particularly preferred because of their higher hydrolysis stability. The polyetherols are usually prepared by base-catalyzed addition of lower alkylene oxides in particular ethylene oxide and/or propylene oxide, onto 2- to 8-functional, in particular 2- to 6-functional, initiator substances.

The compounds (b) which are reactive toward isocyanates can also include chain extenders- and/or crosslinkers. The chain extenders are predominantly 2- or 3-functional alcohols having molecular weights of from 60 to 499, for example ethylene glycol, propylene glycol, 1,4-butanediol or 1,5-pentanediol. The crosslinkers are compounds having molecular weights of from 60 to 499 and usually from 3 to 6 active H atoms, preferably amines and particularly preferably alcohols, for example glycerol, trimethylolpropane and/or pentaerythritol. The products produced according to the present invention can be produced in the presence or absence of chain extenders and/or crosslinkers.

As (c) blowing agents in the production of the foams, water and/or other chemically and/or physically acting blowing agents may, if desired, be used in addition to the carbamates of the present invention. Examples of physically acting blowing agents are (cyclo)aliphatic hydrocarbons, preferably those having from 4 to 8, particularly preferably from 4 to 6 and in particular 5, carbon atoms, for example cyclopentane, n-pentane and/or isopentane, partially halogenated hydrocarbons or ethers, ketones or acetates. Preference is given to mixtures comprising water and at least one physically acting blowing agent. The amount of blowing agents used depends on the desired density of the foams. The proportion by weight of the carbamates of the present invention as a fraction of the total weight of the blowing agents is preferably from 1 to 100%, particularly preferably from 50 to 100%, in particular 100%.

The products are usually produced in the presence of customary catalysts (d), for example tertiary amines or organic metal compounds, in particular tin compounds.

The reaction may, if desired, be carried out in the presence of (e) auxiliaries and/or additives, for example fillers, cell regulators, surface-active compounds, stabilizers, internal mold release agents, antioxidants, UV stabilizers and/or dyes.

To produce the polyisocyanate polyaddition products according to the present invention, the isocyanates and the compounds which are reactive toward isocyanates are preferably reacted in such amounts that the equivalence ratio of NCO groups of the isocyanates to the sum of the reactive hydrogen atoms of the compounds which are reactive toward isocyanates is 0.85–1.25:1, preferably 0.95–1.15:1 and in particular 1–1.05:1. If the polyurethanes, in particular, are to contain at least some bound isocyanurate groups, it is customary to employ a ratio of NCO groups to the sum of the reactive hydrogen atoms of 1.5–60:1, preferably 1.5–8:1.

The polyisocyanate polyaddition products are advantageously produced by the one-shot method or by the prepolymer method, for example using the high-pressure or low-pressure technique, usually in open or closed, preferably heatable molds, for example metallic molds.

It has been found to be particularly advantageous to employ the two-component process and to combine the compounds which are reactive toward isocyanates and, if desired, the blowing agent or blowing agents, the catalysts and/or auxiliaries and/or additives for the respective reaction mixture as component (A) and to use the isocyanates or mixtures of the isocyanates and, if desired, blowing agents as component (B).

The starting components of the respective reaction mixture are usually, depending on the application, mixed at from 0 to 100° C., preferably from 15 to 60° C., and introduced, for example, into the open mold or under atmospheric or superatmospheric pressure into the closed mold. The temperature of the mold or, if no mold is used, the temperature at which the reaction takes place is usually >30° C., preferably from 35 to 110° C.

If desired, the reaction can be carried out in direct contact with, for example, a film and/or in the presence of a woven fabric, for example in a mold in which a film or a fabric has been placed prior to filling with the reaction mixture.

The invention is illustrated by the examples below.

EXAMPLES

Preparation of the Carbamate Solutions

The carbamates were prepared by passing gaseous carbon dioxide into a solution of 2-(2-aminoethylamino)ethanol in a solvent (carbamate 1–6) or without solvent (carbamate 7 and 8) at 40–80° C. The absorption of carbon dioxide was followed continuously by the weight increase of the solution and the reaction was stopped after reaching the molar ratios of alkanolamine to carbon dioxide indicated in Table 1.

TABLE 1

|  | Carbon dioxide content (mol of $CO_2$ per mol of alkanolamine) | Viscosity at 25° C. [mPas] | Weight ratio of carbamate to solvent |
|---|---|---|---|
| Carbamate 1 | 0.57 | 680 | 1:1 (Ethylene glycol) |
| Carbamate 2 | 0.75 | 1030 | 1:1 (Ethylene glycol) |
| Carbamate 3 | 0.85 | 1330 | 1:1 (Ethylene glycol) |
| Carbamate 4 | 0.85 | 4000 | 5.76:4.24 (Ethylene glycol) |
| Carbamate 5 | 0.75 | 7500 | 5.68:4.32 (1,4-Butanediol) |
| Carbamate 6 | 0.75 | 3450 | 1:1 (1,4-Butanediol) |
| Carbamate 7 (comparison) | 0.57 | At 40° C. >100,000 | No solvent |
| Carbamate 8 (comparison) | 0.68 | Not able to be determined | No solvent |

According to the present invention, carbon dioxide could be taken up until a content of 0.85 mol of carbon dioxide per mole of alkanolamine was reached, while in the preparation of the carbamate in the absence of solvent, the liquid was highly viscous at a content of only 0.57. Uptake of carbon dioxide to a molar ratio of, for example, 1:0.85 was not possible in the absence of solvents owing to the great increase in viscosity, even at a higher temperature.

Production of Flexible Polyurethane Foams

The reaction systems listed in Table 2 were reacted at a material temperature of 40° C. and an index of 105 in a cup having a volume of 690 ml. 350 g (Examples 1 and 2) or 250 g (Examples 3 and 4) of the respective reaction system were used.

TABLE 2

|  | Example 1 | Example 2 | Example 3 | Example 4 |
|---|---|---|---|---|
| Polyol 1 [parts by weight] | 87.8 | 87.8 | 60.9 | 58.8 |
| Polyol 2 [parts by weight] | — | — | 30 | 30 |
| 1,4-Butanediol [parts by weight] | — | — | — | 3.2 |
| Ethylene glycol [parts by weight] | 4.2 | 4.2 | 1.1 | — |
| Catalyst 1 [parts by weight] | 0.9 | 0.9 | 1 | 1 |
| Catalyst 2 [parts by weight] | 0.2 | 0.2 | — | — |
| Carbamate 1 [parts by weight] | 5.4 | — | — | — |
| Carbamate 2 [parts by weight] | — | — | 7 | — |
| Carbamate 3 [parts by weight] | — | 5.4 | — | — |
| Carbamate 6 [parts by weight] | — | — | — | 7 |
| Black paste [parts by weight] | 1.5 | 1.5 | — | — |
| Polyisocyanate [parts by weight] | 52.1 | 51.6 | 45 | 45 |
| Cream time | 8–10 s | 7–8 s | 15 s | 15 s |
| Rise time | 50–54 s | 48–50 s | 55 s | 53 s |

TABLE 2-continued

|  | Example 1 | Example 2 | Example 3 | Example 4 |
|---|---|---|---|---|
| Density (free-foamed) | 320–330 kg/m$^3$ | 270–280 kg/m$^3$ | 265–275 kg/m$^3$ | 215–225 kg/m$^3$ |

Foams having a low density can be produced using the carbamates of the present invention even without addition of further blowing agents.

Production of Flexible Integral Foams

Using the reaction systems listed in Table 3, both steering wheels and test plates having dimensions of 200×200×40 mm were produced in customary molds (steel mold for the test plates). The molds were filled by means of a customary high-pressure mixing unit. The temperature of the starting components was from 30 to 40° C. and the mold temperature was 40° C. The amount of reaction system which was introduced into the steering wheel mold was calculated so that the overall density of the steering wheel was in each case 450 kg/m$^3$. The inside walls of the molds were provided with a customary mold release agent prior to filling with the reaction systems. The steering wheels could be taken from the mold after 3 minutes, the test plates after 6 minutes (Example 5) or 4 minutes (Example 6).

TABLE 3

|  | Example 5 | Example 6 |
|---|---|---|
| Polyol 1 | 57 parts by weight | 55.2 parts by weight |
| Polyol 2 | 30 parts by weight | 30 parts by weight |
| Ethylene glycol | 6.5 parts by weight | 4.6 parts by weight |
| Catalyst 1 | 0.8 parts by weight | 0.6 parts by weight |
| Catalyst 2 | 0.2 parts by weight | 0.2 parts by weight |
| Water | 0.5 parts by weight | — |
| Carbamate 2 | — | 4.4 parts by weight |
| Black paste | 5 parts by weight | 5 parts by weight |
| Polyisocyanate | 49 parts by weight | 49 parts by weight |
| Steering wheels: |  |  |
| Pores in the outer skin | Pores clearly visible | No pores visible |
| Pebbling after abrasion test (DIN 53339) | Distinct abrasion losses and pebbling | Hardly any abrasion losses or pebbling observed |
| Test plates: |  |  |
| Density [kg/m$^3$] | 449 | 451 |
| Testing of the skin: |  |  |
| Density [kg/m$^3$] | 610 | 667 |
| Tensile strength [kPa] | 4183 | 5332 |
| Tear propagation resistance [N/mm] | 8.6 | 8.6 |

In further experiments, test plates were produced using the reaction systems of Examples 5 and 6; these test plates had a density of 449 and 451 kg/m$^3$, respectively, and a Shore A hardness of 59 and 60, respectively.

Polyol 1: Polyether triol having a hydroxyl number of 28 mg KOH/g, prepared by propoxylation of glycerol and subsequent ethoxylation (propylene oxide:ethylene oxide weight ratio=86:14).

Polyol 2: Polyether diol having a hydroxyl number of 29 mg KOH/g, prepared by propoxylation of propylene glycol and subsequent ethoxylation (propylene oxide-:ethylene oxide weight ratio=81:19)

Catalyst 1 and Catalyst 2: Polyurethane Catalysts from the Class of Tertiary Amines Polyisocyanate: Mixture consisting of 75 parts by weight of a polyisocyanate mixture containing carbodiimide groups, having an NCO content of 29.5% by weight and prepared by partial carbodiimidization of diphenylmethane 4,4'-diisocyanate and 25 parts by weight of a prepolymer prepared from 87.01 parts by weight of diphenylmethane 4,4'-diisocyanate, 8.14 parts by weight of dipropylene glycol and 4.85 parts by weight of a polyoxypropylene polyol having a hydroxyl number of 250 mg KOH/g which had been initiated using 1,2-propylene glycol and having an NCO content of 23% by weight. The polyisocyanate had a total NCO content of 27.8% by weight.

The details of the starting components apply to Table 2 and Table 3.

The foams produced according to the present invention thus had the advantages discussed above, in particular improved tensile strength and improved abrasion behavior of the skin, reduced pore formation and a reduced catalyst requirement together with reduced time in the mold and an excellent visual impression.

We claim:

1. A process for producing a foam, comprising reacting (a) isocyanates with (b) compounds which are reactive toward isocyanates in the presence of (c) blowing agents and, optionally, (d) catalysts and/or (e) auxiliaries and/or additives, wherein said blowing agents comprise a carbamate solution comprising the reaction product of at least one alkanolamine with carbon dioxide in a solvent comprising an organic compound having a molecular weight of from 60 to 600 and containing at least one hydroxyl group, wherein the carbamate contains at least 0.51 mol of bound carbon dioxide per mole of alkanolamine and the alkanolamine has one of the following formulae:

$$NH_2—X—OH \quad (I)$$

$$HO—X—Y—OH \quad (II)$$

$$HO—X—NR^9—(CR^7R^8)_{n5}—Y—OH \quad (III)$$

where

X: $—[(CR^1R^2)_{n1}—NR^3]_{n2}—[(CR^4R^5)_{n3}—NR^6]_{n4}—(CR^7R^8)_{n5}—$

Y: $—[NR^6—(CR^4R^5)_{n3}]_{n4}—[NR^3—(CR^1R^2)_{n1}]_{n2}—$ and n1, n3, n5: identical or different integers selected from the group consisting of 1, 2, 3, and 4, n2, n4: identical or different integers selected from the group consisting of 0, 1, 2, 3, 4, 5, and 6, where for each of X and Y the sum of n2 and n4 is greater than or equal to 1, $R^1$, $R^2$, $R^4$, $R^5$, $R^7$, $R^8$: identical or different radicals selected from the group consisting of hydrogen, aliphatic, cycloaliphatic, araliphatic and aromatic radicals having from 1 to 20 carbon atoms, $R^3$, $R^6$, $R^9$: identical or different radicals selected from the group consisting of hydrogen, aliphatic, cycloaliphatic, araliphatic and aromatic radicals having from 1 to 20 carbon atoms.

2. A process for producing a foam based on polyisocyanate polyaddition products, comprising adding as a blowing agent during said process a carbamate solution comprising the reaction product of at least one alkanolamine, containing multiple amine functional groups, with carbon dioxide in a solvent comprising an organic compound having a molecular weight of 60–600 and containing at least one hydroxyl group, wherein the carbamate contains at least 0.51 mol of bound carbon dioxide per mole of alkanolamine.

3. A process for producing flexible foams based on polyisocyanate polyaddition products, wherein a carbamate solution as claimed in claim 1 is used as blowing agent.

4. A process for producing flexible or semirigid integral foams based on polyisocyanate polyaddition products, wherein a carbamate solution as claimed in claim 1 is used as blowing agent.

5. A process as claimed in claim 1 wherein the alkanolamine comprises substances selected from the group consisting of 2-(2-aminoethylamino)ethanol, 3-(2-aminoethylamino)propanol, 2-(3-aminopropylamino)ethanol, 1-(2-aminoethylamino)-2-propanol, 2-[(3-aminopropyl)methylamino)]ethanol, 1-[(2-amino-1-methylethyl)amino]-2-propanol, 2-[(2-amino-2-methylpropyl)amino]-2-methyl-1-propanol, 2-[(4-amino-3-methylbutyl)amino]-2-methyl-1-propanol, 17-amino-3,6,9,12,15-pentaazaheptadecan-1-ol, 3,7,12,16-tetraazaoctadecane-1,18-diol and mixtures thereof.

6. A process as claimed in claim 1 wherein the foam is adapted for use as a steering wheel, spoiler, dashboard, shoe sole or shoe lining.

7. A steering wheel, spoiler, dashboard, shoe sole or shoe lining produced according to a process as claimed in claim 1.

8. A process for producing a foam according to claim 2 wherein the alkanolamine has one of the following formulae:

$$NH_2-X-OH \qquad (I)$$

$$HO-X-Y-OH \qquad (II)$$

$$HO-X-NR^9-(CR^7R^8)_{n5}-Y-OH \qquad (III)$$

where

X: $-[(CR^1R^2)_{n1}-NR^3]_{n2}-[(CR^4R^5)_{n3}-NR^6]_{n4}-(CR^7R^8)_{n5}-$

Y: $-[NR^6-(CR^4R^5)_{n3}]_{n4}-[NR^3-(CR^1R^2)_{n1}]_{n2}-$ and n1, n3, n5: identical or different integers selected from the group consisting of 1, 2, 3, and 4, n2, n4: identical or different integers selected from the group consisting of 0, 1, 2, 3, 4, 5, and 6, where for each of X and Y the sum of n2 and n4 is greater than or equal to 1, $R^1$, $R^2$, $R^4$, $R^5$, $R^7$, $R^8$: identical or different radicals selected from the group consisting of hydrogen, aliphatic, cycloaliphatic, araliphatic and aromatic radicals having from 1 to 20 carbon atoms, $R^3$, $R^6$, $R^9$: identical or different radicals selected from the group consisting of hydrogen, aliphatic, cycloaliphatic, araliphatic and aromatic radicals having from 1 to 20 carbon atoms.

9. A process for producing flexible foams based on polyisocyanate polyaddition products, comprising reacting (a) isocyanates with (b) compounds which are reactive toward isocyanates in the presence of (c) blowing agents and, optionally, (d) catalysts and/or (e) auxiliaries and/or additives, wherein said blowing agents comprise the carbamate solution of claim 2.

10. A process for producing flexible or semirigid integral foams based on polyisocyanate polyaddition products, (a) isocyanates with (b) compounds which are reactive toward isocyanates in the presence of (c) blowing agents and, optionally, (d) catalysts and/or (e) auxiliaries and/or additives, wherein said blowing agents comprise the carbamate solution of claim 2.

11. A process as claimed in claim 2 wherein the alkanolamine comprises substances selected from the group consisting of 2-(2-aminoethylamino)ethanol, 3-(2-aminoethylamino)propanol, 2-(3-aminopropylamino)ethanol, 1-(2-aminoethylamino)-2-propanol, 2-[(3-aminopropyl)methylamino)]ethanol, 1-[(2-amino-1-methylethyl)amino]-2-propanol, 2-[(2-amino-2-methylpropyl)amino]-2-methyl-1-propanol, 2-[(4-amino-3-methylbutyl)amino]-2-methyl-1-propanol, 17-amino-3,6,9,12,15-pentaazaheptadecan-1-ol, 3,7,12,16-tetraazaoctadecane-1,18-diol and mixtures thereof.

12. A process as claimed in claim 2 wherein the foam is adapted for use as a steering wheel, spoiler, dashboard, shoe sole or shoe lining.

13. A steering wheel, spoiler, dashboard, shoe sole or shoe lining produced according to a process as claimed in claim 2.

14. A process for producing a foam, comprising reacting (a) isocyanates with (b) compounds which are reactive toward isocyanates in the presence of (c) blowing agents and, optionally, (d) catalysts and/or (e) auxiliaries and/or additives, wherein said blowing agents comprise a carbamate solution comprising the reaction product of at least one alkanolamine with carbon dioxide in a solvent comprising an organic compound having a molecular weight of 60–600 and containing at least one hydroxyl group, wherein the carbamate contains at least 0.51 mol of bound carbon dioxide per mole of alkanolamine and the alkanolamine is a monol and/or a diol comprising at least two amine functional groups.

15. A process for producing a foam according to claim 14 wherein the alkanolamine has one of the following formulae:

$$NH_2-X-OH \qquad (I)$$

$$HO-X-Y-OH \qquad (II)$$

$$HO-X-NR^9-(CR^7R^8)_{n5}-Y-OH \qquad (III)$$

where

X: $-[(CR^1R^2)_{n1}-NR^3]_{n2}-[(CR^4R^5)_{n3}-NR^6]_{n4}-(CR^7R^8)_{n5}-$

Y: $-[NR^6-(CR^4R^5)_{n3}]_{n4}-[NR^3-(CR^1R^2)_{n1}]_{n2}-$ and n1, n3, n5: identical or different integers selected from the group consisting of 1, 2, 3, and 4, n2, n4: identical or different integers selected from the group consisting of 0, 1, 2, 3, 4, 5, and 6, where for each of X and Y the sum of n2 and n4 is greater than or equal to 1, $R^1$, $R^2$, $R^4$, $R^5$, $R^7$, $R^8$: identical or different radicals selected from the group consisting of hydrogen, aliphatic, cycloaliphatic, araliphatic and aromatic radicals having from 1 to 20 carbon atoms, $R^3$, $R^6$, $R^9$: identical or different radicals selected from the group consisting of hydrogen, aliphatic, cycloaliphatic, araliphatic and aromatic radicals having from 1 to 20 carbon atoms.

16. A process for producing flexible foams based on polyisocyanate polyaddition products, comprising reacting (a) isocyanates with (b) compounds which are reactive toward isocyanates in the presence of (c) blowing agents and, optionally, (d) catalysts and/or (e) auxiliaries and/or additives, wherein said blowing agents comprise the carbamate solution of claim 14.

17. A process for producing flexible or semirigid integral foams based on polyisocyanate polyaddition products, (a) isocyanates with (b) compounds which are reactive toward isocyanates in the presence of (c) blowing agents and, optionally, (d) catalysts and/or (e) auxiliaries and/or additives, wherein said blowing agents comprise the carbamate solution of claim 14.

18. A process as claimed in claim 14 wherein the alkanolamine comprises substances selected from the group consisting of 2-(2-aminoethylamino)ethanol, 3-(2-aminoethylamino)propanol, 2-(3-aminopropylamino) ethanol, 1-(2-aminoethylamino)-2-propanol, 2-[(3-aminopropyl)methylamino)]ethanol, 1-[(2-amino-1-methylethyl)amino]-2-propanol, 2-[(2-amino-2-methylpropyl)amino]-2-methyl-1-propanol, 2-[(4-amino-3-methylbutyl)amino]-2-methyl-1-propanol, 17-amino-3,6,9,12,15-pentaazaheptadecan-1-ol, 3,7,12,16-tetraazaoctadecane-1,18-diol and mixtures thereof.

19. A process as claimed in claim 14, wherein the alkanolamine comprises 2-2-aminoethylamino)ethanol.

20. A process as claimed in claim 14 wherein the foam is adapted for use as a steering wheel, spoiler, dashboard, shoe sole or shoe lining.

21. A steering wheel, spoiler, dashboard, shoe sole or shoe lining produced according to a process as claimed in claim 14.

* * * * *